US009092295B2

(12) United States Patent
Vidal

(10) Patent No.: US 9,092,295 B2
(45) Date of Patent: Jul. 28, 2015

(54) MANAGING SOFTWARE PACKAGE UPDATES USING COMMUNICATION PIPES

(75) Inventor: Seth Kelby Vidal, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1070 days.

(21) Appl. No.: 12/714,208

(22) Filed: Feb. 26, 2010

(65) Prior Publication Data

US 2011/0214116 A1    Sep. 1, 2011

(51) Int. Cl.
  *G06F 9/445*    (2006.01)
(52) U.S. Cl.
  CPC .......................................... *G06F 8/65* (2013.01)
(58) Field of Classification Search
  CPC .................................... G06F 8/65; G06F 8/60
  USPC ............................. 717/137, 171, 173; 714/48
  See application file for complete search history.

(56) References Cited

U.S. PATENT DOCUMENTS

| | | | |
|---|---|---|---|
| 5,845,077 A * | 12/1998 | Fawcett ........................ | 709/221 |
| 6,438,749 B1 | 8/2002 | Chamberlain | |
| 6,553,507 B1 * | 4/2003 | Cohen ........................... | 714/4.1 |
| 6,789,215 B1 * | 9/2004 | Rupp et al. ................. | 714/38.14 |
| 7,200,390 B1 * | 4/2007 | Henager et al. .............. | 455/419 |
| 7,240,336 B1 | 7/2007 | Baker | |
| 7,284,157 B1 * | 10/2007 | McMichael et al. ....... | 714/38.13 |
| 7,349,960 B1 * | 3/2008 | Pothier et al. ................ | 709/224 |
| 7,512,939 B2 | 3/2009 | Brookner | |
| 7,624,393 B2 | 11/2009 | Egan et al. | |
| 7,657,885 B2 | 2/2010 | Anderson | |
| 7,836,341 B1 | 11/2010 | Krishnan | |
| 7,853,943 B2 * | 12/2010 | McCaleb et al. .............. | 717/173 |
| 8,141,071 B2 * | 3/2012 | McCaleb et al. .............. | 717/172 |
| 8,230,415 B1 * | 7/2012 | Thomas ......................... | 717/173 |
| 8,312,440 B2 * | 11/2012 | Iwama et al. ................. | 717/154 |
| 2003/0051235 A1 | 3/2003 | Simpson | |
| 2003/0229890 A1 | 12/2003 | Lau et al. | |
| 2005/0210459 A1 | 9/2005 | Henderson et al. | |
| 2006/0075001 A1 * | 4/2006 | Canning et al. .............. | 707/203 |
| 2006/0080651 A1 * | 4/2006 | Gupta et al. .................. | 717/169 |
| 2006/0190773 A1 | 8/2006 | Rao et al. | |

(Continued)

OTHER PUBLICATIONS nixCraft, "How to Simulate Linux Package Upgrade Without Installing Anything ( Dry Run )," Jul. 6, 2008, http://www.cyberciti.biz/faq/debian-ubuntu-linux-simulate-package-upgrade/.*

(Continued)

*Primary Examiner* — Farley Abad
(74) *Attorney, Agent, or Firm* — Lowenstein Sandler LLP

(57) ABSTRACT

Embodiments relate to systems and methods for managing software package updates using communication pipes. According to aspects, one or more client machines can initiate package update activity, for instance a software package update using a package manager. In aspects, instead of accessing a package repository directly via the update manager or utility, the package manager can be configured to communicate with a set of communication pipes, such as inter-process communication (IPC) sockets, pipes, or other resources. The user can thereby invoke a pipeable update process, perform enhanced update activity, and share the results with various programs or threads. For example, the user can set the update process to generate a report of prospective or available update activity, without actually implementing the updates. Error codes during these and other types of diagnostic processing can be generated and logged for debugging purposes.

26 Claims, 4 Drawing Sheets

(56) References Cited

U.S. PATENT DOCUMENTS

| | | |
|---|---|---|
| 2006/0230398 A1 | 10/2006 | Yokota |
| 2007/0038991 A1 | 2/2007 | Schuft et al. |
| 2007/0157192 A1 | 7/2007 | Hoefler et al. |
| 2007/0169075 A1 | 7/2007 | Lill et al. |
| 2008/0134165 A1 | 6/2008 | Anderson et al. |
| 2008/0141240 A1 | 6/2008 | Uthe |
| 2008/0201705 A1 | 8/2008 | Wookey |
| 2009/0013319 A1 | 1/2009 | Williams et al. |
| 2009/0037897 A1 | 2/2009 | Dull et al. |
| 2009/0265690 A1* | 10/2009 | Naslavsky et al. ............ 717/126 |
| 2009/0300595 A1 | 12/2009 | Moran et al. |
| 2010/0023933 A1 | 1/2010 | Bryant et al. |
| 2010/0058308 A1 | 3/2010 | Demshur et al. |
| 2010/0058314 A1 | 3/2010 | Wang |
| 2010/0083243 A1 | 4/2010 | Mincarelli et al. |

OTHER PUBLICATIONS

Ramankutty, Hiran, "Inter-Process Communication—Part 1,"Jul. 2004, Issue 104 of Linux Gazette.*

Seth Kelby Vidal, "Systems and Methods for Initiating Software Repairs in Conjugtion With Software Package Updates", U.S. Appl. No. 12/714,200, filed Feb. 26, 2010.

Seth Kelby Vidal, "Systems and Methods for Diagnostic Notification Via Package Update Manager", U.S. Appl. No. 12/714,258, filed Feb. 26, 2010.

Seth Kelby Vidal, "Systems and Methods for Managing Versions of Software Packages", U.S. Appl. No. 13/037,363, filed Mar. 1, 2011.

Seth Kelby Vidal, "Systems and Methods for Generating and Storing Translation Information as Package Metadata", U.S. Appl. No. 12/714,171, flled Feb. 26, 2010.

Seth Kelby Vidal, "Systems and Methods for Generating Predictive Diagnostics Via Package Update Manager", U.S. Appl. No. 12/714,222, filed Feb. 26, 2010.

James Antill, "Systems and Methods for Defining and Enforcing Access Policy for Package Update Processes", U.S. Appl. No. 12/873,850, filed, Sep. 1, 2010.

Seth Kelby Vidal, "Systems and Methods for Generating Cached Representations of Encoded Package Profile", U.S. Appl. No. 12/788,139, filed May 26, 2010.

Seth Kelby Vidal, "Systems and Methods for Generating Cached Representations of Host Package Inventories in Remote Package Repositories", U.S. Appl. No. 12/790,699, filed May 28, 2010.

Seth Kelby Vidal, "Systems and Methods for Generating Package Profiles in Software Package Repositories Using Selective Subsets of Packages", U.S. Appl. No. 12/873,557, filed Sep. 1, 2010.

Seth Kelby Vidal, "Systems and Methods for Generating an Encoded Package Profile Based on Executing Host Processes", U.S. Appl. No. 12/787,104, filed May 26, 2010.

Seth Kelby Vidal, "Systems and Methods for Restoring Machine State History Related to Detected Faults in Package Update Process", U.S. Appl. No, 12/788,036, filed May 26, 2010.

Seth Kelby Vidal, "Systems and Methods for Generating Client Qualification to Execute Package Update Manager", U.S. Appl. No. 12/788,458, filed May 27, 2010.

Seth Kelby Vidal, "Systems and Methods for Determining When to Update a Package Manager Software", U.S. Appl. No. 12/790,752, filed May 28, 2010.

Seth Kelby Vidal, "Systems and Methods for Generating Exportable Encoded Identifications of Networked Machines Based on Installed Package Profiles", U.S. Appl. No. 12/768,416, filed Apr. 27, 2010.

Seth Kelby Vidal, "Systems and Methods for Tracking Computing Systems Utilizing Software Repositories", U.S. Appl. No. 12/955,671, filed Nov. 29, 2010.

Seth Kelby Vidal, "Systems and Methods for Automatic Upgrade and Downgrade in Package Update Operations", U.S. Appl. No. 12/892,227, filed Sep. 28, 2010.

Seth Kelby Vidal, "Systems and Methods for Detection of Malicious Software Packages", U.S. Appl. No. 12/898,876, filed Oct. 6, 2010.

Seth Kelby Vidal, "Systems and Methods for Space Efficient Software Package Management", U.S. Appl. No. 12/610,006, filed Oct. 30, 2009.

* cited by examiner

MANAGING SOFTWARE PACKAGE UPDATES USING COMMUNICATION PIPES

FIELD

The present teachings relate to systems and methods for software package updates using communication pipes, and more particularly to platforms and techniques for connecting software package update processes to available update repositories and other resources using programmatic communication pipes, including user-selectable reporting, debugging, and other options.

BACKGROUND OF RELATED ART

Users of physical or virtual machines commonly install software packages, including package updates, to physical or virtual machines. The software packages can contain a set of related files chosen to perform a given application or task, such as, for example, a group of software applications, drivers, and/or other resources used to install and use messaging applications. In instances, a software package can contain application software, operating system software, drivers, patches, and/or other software components grouped as a logical set.

Software package update managers exist to help a user initiate and perform software package updates, such as, for example, the "yum" (Yellowdog update manager) package update manager available from Red Hat Inc., and others. In general, available software package managers are configured to interact with the set of installed packages on a client and with one or more software package repositories, to directly connect to those databases and download available package updates. Available package managers do not, however, permit the interaction of other software applications or processes with package update activity. A user who wishes, for instance, to view potential package updates by checking the available versions from current package repositories may be forced, for instance, to invoke a conventional package manager, perform a "scrape" of URLs (universal resource locators) or other identifiers, and invoke another program or tool to go to those locations to see what package files may apply to their machine. Because existing package update managers are not configured to permit inter-process communication with other applications, threads, or processes, direct sharing of package update sources and options may not be possible. It may be desirable to provide systems and methods for software package updates using communication pipes, to permit a user to invoke additional and more flexible applications, tools, and logic to manage the package update process, including to perform advanced testing and debugging of software packages.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for software package updates using communication pipes. More particularly, embodiments related to platforms and techniques for monitoring and managing the suite of installed packages that may be hosted on a physical or virtual client machine. In aspects, a package manager can communicate with one or more software package repositories via a set of communication pipes to identify, test, and obtain desired software packages. The use of pipeable access to software package resources (rather than for instance "hard-wired" access through one application only) can permit the user to set and share a variety of package update parameters, to permit flexible testing and management of software package delivery. The set of communication pipes can be accessed by a package manager, and other applications and tools to configure those parameters and perform diagnostic and other activity on software package updates or potential updates. The set of diagnostics that can be performed via the pipe-connected package manager can include various dry-run, verification, reporting, error capture, and/or other package processing parameters and settings. These and other embodiments described herein address the various noted shortcomings in known package update technology, and provide a user with enhanced control and debugging capability for managing their software package resources.

Reference will now be made in detail to exemplary embodiments of the present teachings, which are illustrated in the accompanying drawings. Where possible the same reference numbers will be used throughout the drawings to refer to the same or like parts.

Figure 1:
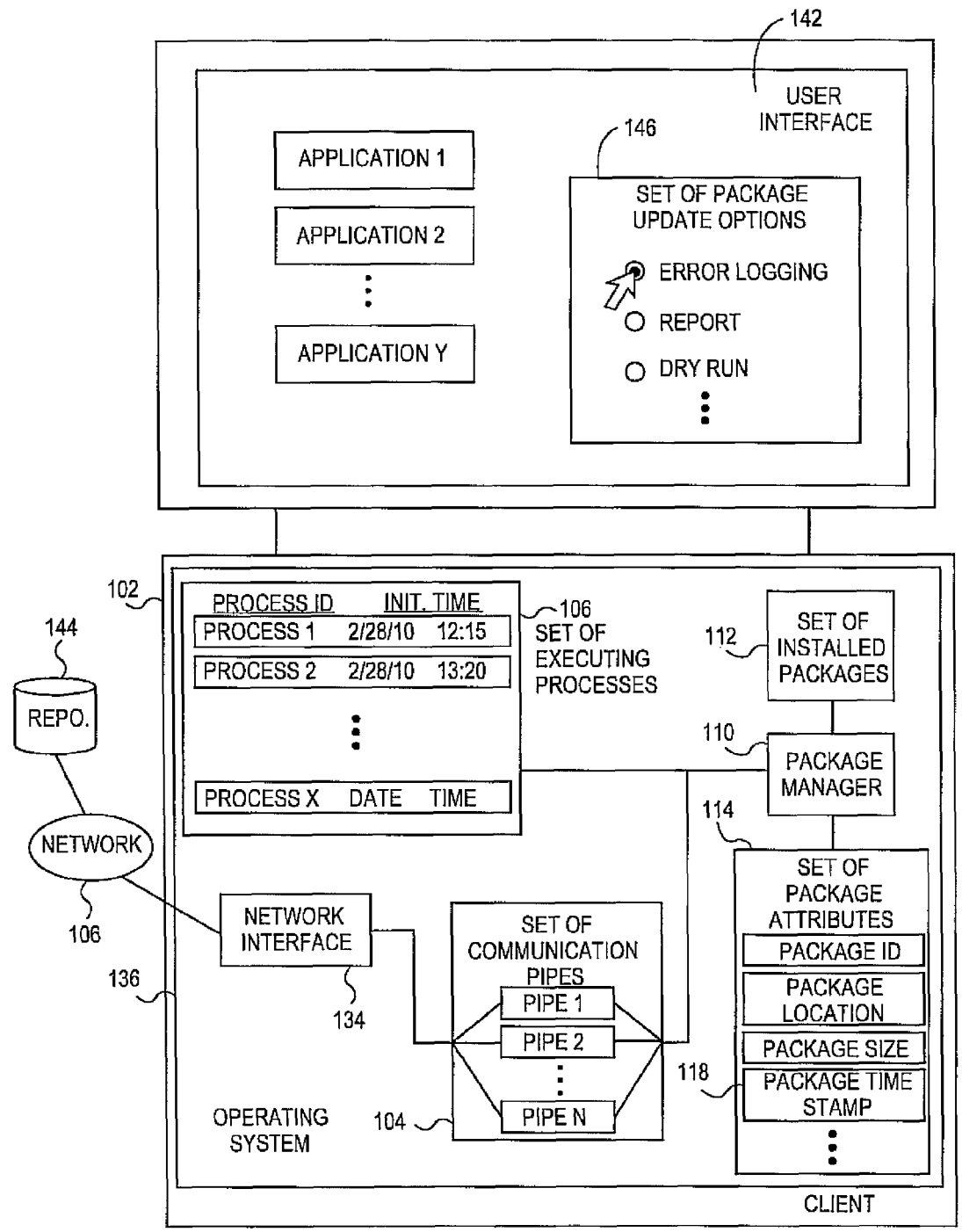
FIG. 1 illustrates an overall network in which systems and methods for software package updates using communication pipes can be implemented, according to various embodiments.

FIG. 1 illustrates an exemplary system 100 in which systems and methods for software package updates using communication pipes update can be implemented, according to various embodiments. In embodiments as shown, a client 102 can store, execute, and otherwise host a variety of resources including a package manager 110 configured to communicate with a set of installed packages 112, and other software and resources. In embodiments, package manager 110 can be or include a software application, a utility, an application programming interface (API) to an operating system 136 of client 102, a service, and/or other local or remote logic or resources. According to embodiments, in package manager 110 can access and manage set of installed packages 112 to run, edit, update, configure, and otherwise manage one or more software packages hosted or installed in client 102. In aspects, package manager can be or include one or more commercially and/or publicly available package manager applications or resources, such as the "yum" package update manager available from Red Hat Inc. based on the Red Hat package manager (rpm) platform, or others.

In aspects, set of installed software packages 112 can be or include packages comprising various types of applications, such as, for example, messaging applications, spreadsheet or modeling applications, social networking applications, word processing applications, and/or other applications or utilities, and can in aspects include an operating system, drivers, and/or components thereof. Set of installed packages 112 can have an associated set of package attributes 114 which records file names, versions, dates, software requirements, an/or other attributes related to the software package updates installed on client 102 and reflected in set of installed software packages 112.

In aspects, package manager 110 can communicate with a network interface 134 via a set of communication pipes 104. Set of communication pipes 104 can comprise a set of inter-process communication (IPC) resources, such as, for example, pipes, sockets, channels, ports, and/or other communication resources. In aspects, set of communication pipes 104 can be instantiated and/or managed by or via operating system 136 of client 102, such as, for example, to authorize, open, close, provide access to, and/or otherwise operate set of communication pipes 104. Network interface 134 can communicate with one or more network 106, such as the public Internet or other public or private networks, and connect to one or more package repository 144 hosting software packages, software package updates, and/or other software or resources.

In aspects, package manager 110 can interact with set of installed packages 112 and one or more package repository 144 via set of communication pipes 104 to configure, test, update, and/or otherwise manage set of installed packages 112 operating on client 102. Package manager 110 can, for example, provide a user with a set of package update options 146 displayed via user interface 142, such as a graphical user interface or others, to select various test, configuration, and/or other management activities on set of installed packages 112. Set of package update options 146 can include options such as one or more selections to perform dry-run or test-only downloads of package updates, to generate reports of the update process, to select installation options, and/or to set other configuration options or parameters for the downloading of package updates from one or more package repositories to set of installed packages 112.

Figure 2:
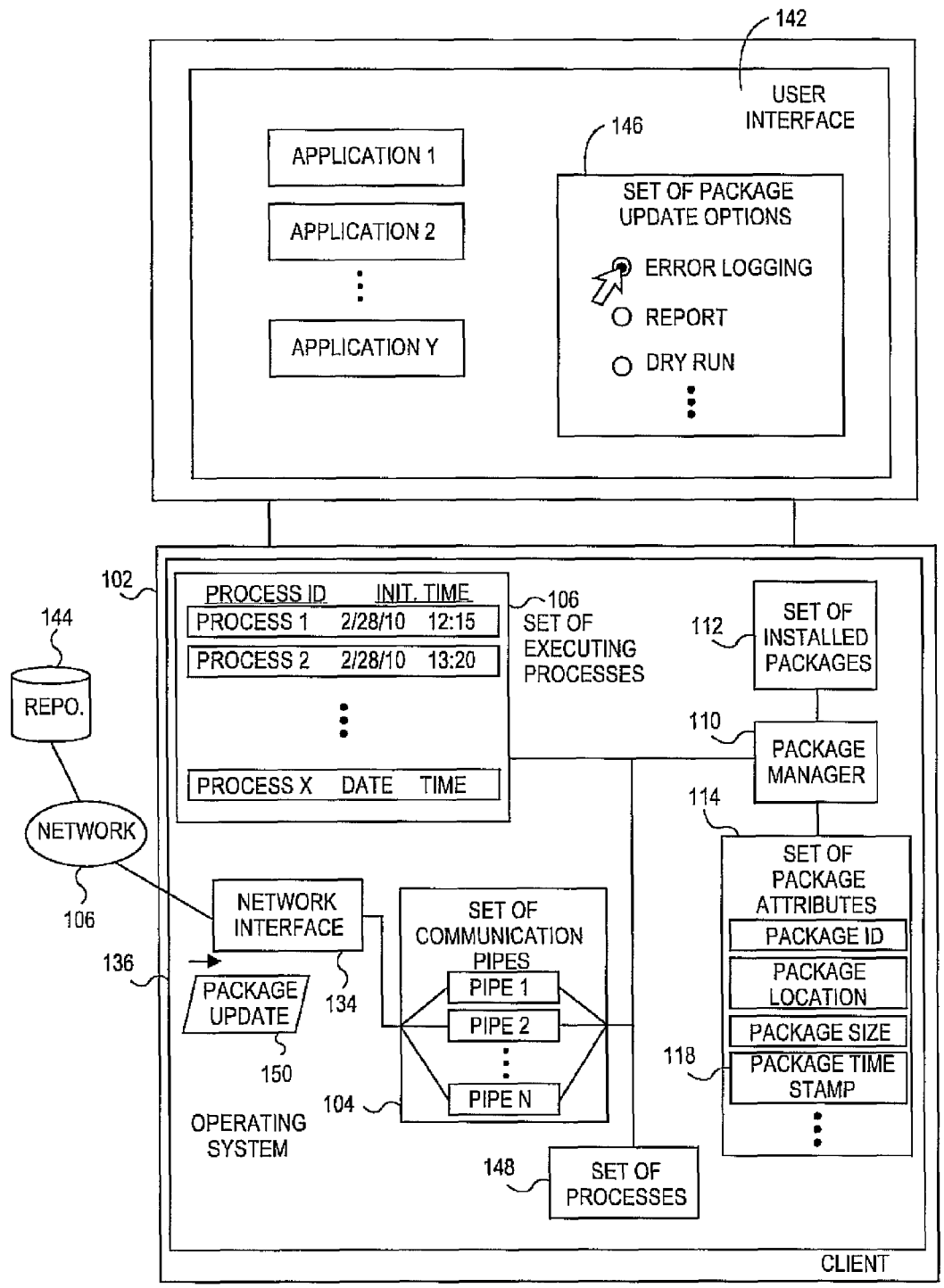
FIG. 2 illustrates an overall network in which for systems and methods for software package updates using communication pipes can be implemented, according to various embodiments in further regards.

As illustrated for example in FIG. 2, package manager 110 can connect to one or more package repository 144 via set of communication pipes 104, to which set of processes 148 is also connected. Set of processes 148 can be or include additional applications, logic, APIs, and/or other resources that can operate with or on set of installed packages 112, software updates located in one or more package repositories 104, and/or other files or resources. By communicating with set of processes, one or more repository 144, set of installed packages 112, and/or other processes, services, and/or resources, package manager 110 can present and manage set of update options 146 with enhanced flexibility, including to initiate the download of one or more package update 150. Thus, for instance, set of processes 148 can include an error reporting module, and set of update options 146 can comprise an option to capture and report errors detected during the retrieval and/or installation of a software package update 150 from one or more repository 104 to set of installed packages 112. Other applications, services, and/or logic can be implemented or used in set of processes. According to aspects, because in regards package manager 110 can initiate software package update activity via a shareable set of communication pipes 104, more flexible and robust package update activities can be carried out. In aspects, in addition, the set of processes 148 and/or other applications, services, and/or resources to which set of installed packages 112 as well as one or more repository 144 is connected via set of communication pipes 104 is configurable and extensible, so that different processes can participate or communicate with package manager 110 over time. For instance, different debugging routines, databases, communications ports, and/or other software, processes, data, or services can be linked to package manager 110 to support its package management operations, based on user configuration or other factors.

Figure 3:
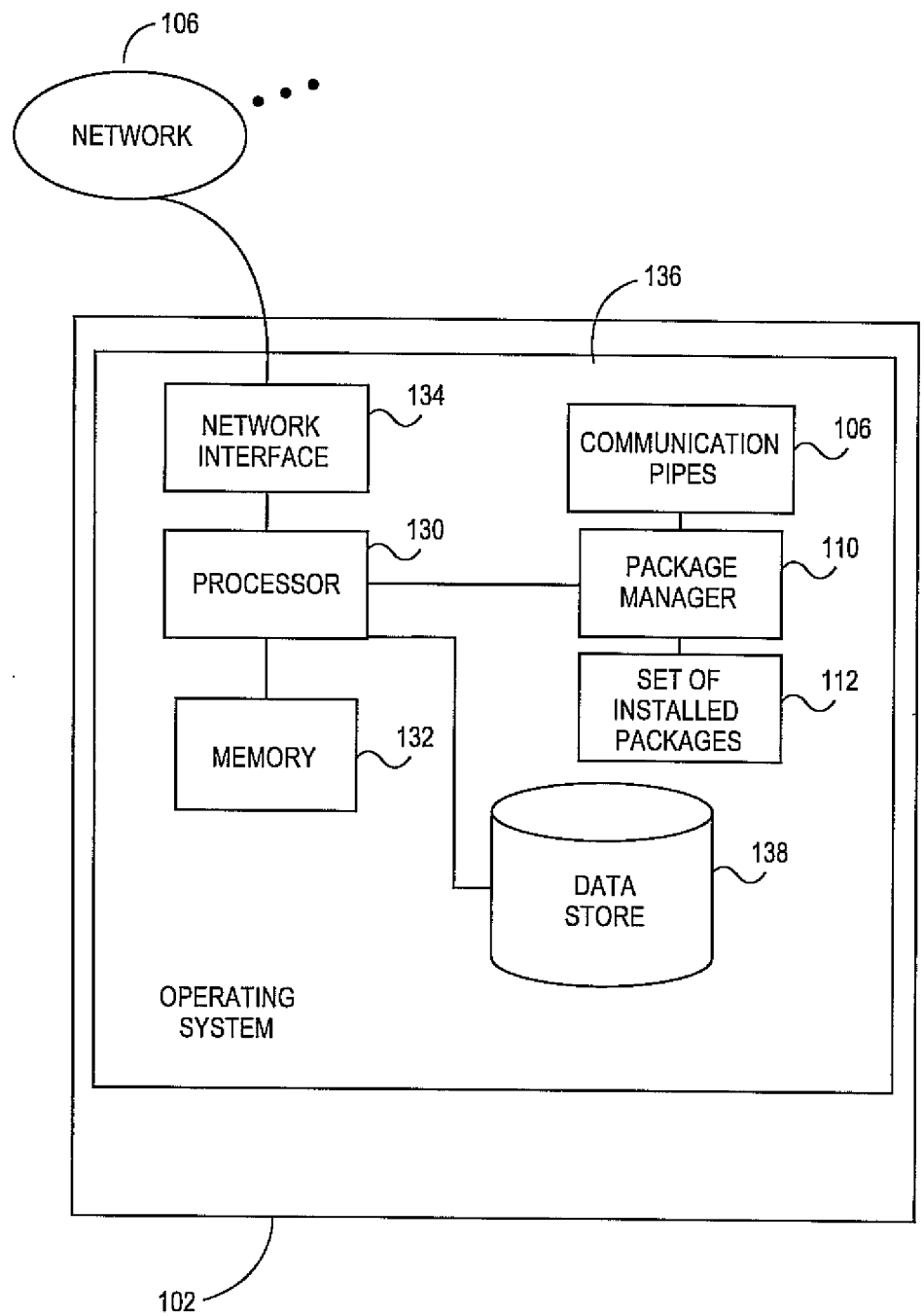
FIG. 3 illustrates exemplary hardware and other resources of a client machine that can be used in systems and methods for software package updates using communication pipes, according to various embodiments.

FIG. 3 illustrates an exemplary diagram of hardware and other resources that can be incorporated in a client 102 configured to manage, analyze, test and configure a set of installed packages 112 and other resources, according to embodiments. In embodiments as shown, client 102 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with data store 138, such as a database stored on a local hard drive. Processor 130 further can communicate with a network interface 134, such as an Ethernet or wireless data connection, which in turn communicates with one or more networks 106, such as the Internet or other public or private networks. Processor 130 also communicates with package manager 110 to execute control logic and control the updating, installation, and management of software packages and their associated processes. Other configurations of client 102, including processor and memory resources, associated network connections, and other hardware and software resources are possible.

Figure 4:
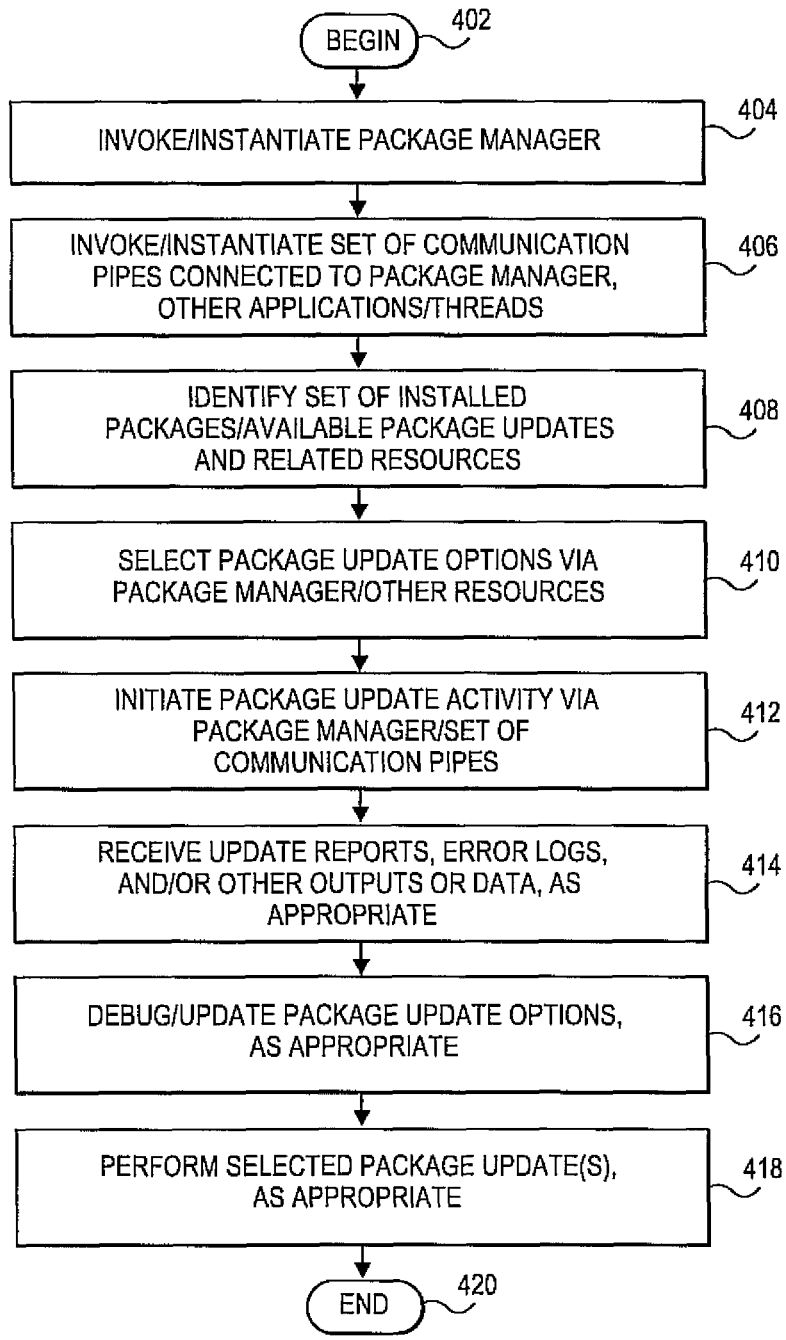
FIG. 4 illustrates a flowchart of software package update management that can be used in systems and methods for software package updates using communication pipes, according to various embodiments.

FIG. 4 illustrates overall processing to track, monitor, and manage software package updates using communication pipes and associated testing and debugging logic, according to various embodiments. In 402, processing can begin. In 404, a user can invoke or instantiate package manager 110 on client 102 to perform software package update maintenance, testing, and other management activity. In 406, package manager 110 and/or other logic can instantiate, invoke, and/or access a set of communication pipes 104 connected to package manager 110 and/or other applications, processes, and/or threads. In aspects, set of communication pipes can comprise a set of inter-process communication (IPC) objects such as pipes, sockets, ports, and/or other resources.

In 408, package manager 110 can identify a set of installed software packages 112 hosted in client 102, for instance, by calling an application programming interface (API) of operating system 136 of client 102 to enumerate installed packages and related resources. Package manager 110 can in addition or instead identify available package updates via communication with a repository 140 hosting one or more sets of software package updates for application, operating system, and/or other software. In 410, a user can select package update options using package manager 110 and/or other resources. In aspects, package update or management options can include, for instance, an option or selection to perform a software package download and update without performing actual or final installation of the package update, for instance to generate a report of the files obtained for installation and potential conflict with other software versions. In aspects, other options can include performing a "dry-run" package update, without any downloading or installation activity simply to identify the files designated for download, and/or other information. In aspects, options can likewise include the generation of error reports, for instance using consistent error codes for different package versions, or other variables.

In 412, package update activity can be initiated via package manager 110 connecting to set of communication pipes 104. For instance, all user-selection options can be used to download a package update to a messaging or spreadsheet application in full-run mode, with logging of download and installation activity. In aspects, the download of a package update and related resources can be made via set of communication pipes 104, and thereby be made available to other applications, processes, threads, and/or services configured to connect to those pipes. For example, an anti-viral application configured to connect to set of communication pipes 104 can monitor or scan the package update before installation. Other content sharing via set of communication pipes 104 can be done.

In 414, any update reports, error logs, and/or other data related to package update activity can be received in update manager 110, as appropriate. In aspects, that data can be received according to user settings, and/or can be automatically captured and stored. In 416, a user can debug and/or update the set of update options, including to change selected package update files or versions, installation libraries, directories, or other locations, to delete one or more selected files or packages designated for updating, and/or perform other actions. In 418, package manager 110 can perform the selected package update(s), with all user configuration selections, as appropriate. In 420, processing can return to a prior processing point, jump to a further processing point, or end.

The foregoing description is illustrative, and variations in configuration and implementation may occur to persons skilled in the art. For example, while embodiments have been described in which a unitary package manager 110 is configured to control package update activity, in embodiments, multiple applications or software can interact to control the downloading, installation, testing, and other management of software packages. For further example, while embodiments have been described in which package update activity is conducted on one client 102, in embodiments, multiple local or remote targets, clients, and/or other machines can register to package manager 110 and/or other logic or resources to receive or perform package update activity. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
    identifying, by a processor, a source of a software package update associated with a first process;
    instantiating, by an operating system, a sharable inter-process communication channel from the source to associate the software package update with a client machine;
    receiving an update parameter indicating a diagnostic activity;
    configuring the update parameter in view of the sharable inter-process communication channel, the sharable inter-process communication channel permitting sharing of the update parameter;
    performing the diagnostic activity on the software package update;
    accessing an option for generating update activity on the client machine in view of the software package update, wherein the option comprises generating a report associated with a test-only download of the software package update;
    downloading the software package update;
    initiating, by the processor, the update activity on the client machine via the sharable inter-process communication channel in view of the report associated with the test-only download of the software package update and in view of the diagnostic activity; and
    sharing the software package update with a second process connected to the sharable inter-process communication channel.

2. The method of claim 1, wherein the source comprises an update repository.

3. The method of claim 1, wherein the inter-process communication channel comprises an authorization layer to authorize the update activity on the client machine.

4. The method of claim 1, wherein the client machine comprises a physical machine or a virtual machine.

5. The method of claim 1, wherein the option comprises a report-only option to generate a report of results of update activity while performing the update activity in a test mode.

6. The method of claim 1, wherein the option comprises a dry-run option to generate a report of results of prospective update activity without performing the update activity.

7. The method of claim 1, wherein the option comprises a logging option to log update activity.

8. The method of claim 7, wherein the logging option comprises an error reporting log to record errors during the update activity.

9. The method of claim 8, wherein the error reporting log comprises an error code.

10. The method of claim 1, wherein the option comprises a selection to select one of installing a software package update, updating a software package update, or removing a software package update.

11. The method of claim 1, wherein the update activity comprises downloading a software package update for installation on the client machine via the inter-process communication channel.

12. A system comprising:
    a sharable inter-process communication channel instantiated by an operating system to communicate with a source of a software package update associated with a first process; and
    a processor to communicate with the source of the software package update via the sharable inter-process communication channel, the processor to:
    associate the software package update with a client machine,
    receive an update parameter to indicate a diagnostic activity,
    configure the update parameter in view of the inter-process communication channel, the inter-process communication channel permitting sharing of the update parameter,
    perform the diagnostic activity on the software package update,
    access an option to generate update activity on the client machine in view of the software package update, wherein the option comprises to generate a report associated with a test-only download of the software package update,
    download the software package update;
    initiate the update activity on the client machine via the inter-process communication channel in view of the report associated with the test-only download of the software package update and in view of the diagnostic activity; and
    share the software package update with a second process connected to the sharable inter-process communication channel.

13. The system of claim 12, wherein the source comprises an update repository.

14. The system of claim 12, wherein the inter-process communication channel comprises an authorization layer to authorize the update activity on the client machine.

15. The system of claim 12, wherein the client machine comprises one of a physical machine or a virtual machine.

16. The system of claim 12, wherein the option comprises a report-only option to generate a report of results of update activity while performing the update activity in a test mode.

17. The system of claim 12, wherein the option comprises a dry-run option to generate a report of results of prospective update activity without performing the update activity.

18. The system of claim 12, wherein the option comprises a logging option to log update activity.

19. The system of claim 18, wherein the logging option comprises an error reporting log to record errors during the update activity.

20. The system of claim 19, wherein the error reporting log comprises an error code.

21. The system of claim 12, wherein the option comprises a selection to select one of to install a software package update, to update a software package update, or to remove a software package update.

22. The system of claim 12, wherein the update activity comprises to download a software package update for installation on the client machine via the inter-process communication channel.

23. A non-transitory machine-readable storage medium comprising instructions to cause a processor to:
    identify, by the processor, a source of a software package update associated with a first process;
    instantiate, by an operating system, a sharable inter-process communication
    channel from the source to associate the software package update with a client machine;
    receive an update parameter indicating a diagnostic activity;
    configure the update parameter in view of the sharable inter-process communication channel, the sharable inter-process communication channel permitting sharing of the update parameter;
    perform the diagnostic activity on the software package update;
    access an option for generating update activity on the client machine in view of the software package update, wherein the option comprises to generate a report associated with a test-only download of the software package update;
    download the software package update;
    instantiate, by the processor, the update activity on the client machine via the inter-process communication channel in view of the report associated with the test-only download of the software package update and in view of the diagnostic activity; and
    share the software package update with a second process connected to the sharable inter-process communication channel.

24. The non-transitory machine-readable storage medium of claim 23, wherein the source comprises an update repository.

25. The non-transitory machine-readable storage medium of claim 23, wherein the inter-process communication channel comprises an authorization layer to authorize the update activity on the client machine.

26. The non-transitory machine-readable storage medium of claim 23, wherein the client machine comprises a physical machine or a virtual machine.

* * * * *